United States Patent [19]

Kazino et al.

[11] Patent Number: 5,190,424
[45] Date of Patent: Mar. 2, 1993

[54] BOLT FOR USE WITH RESIN CLIPS

[75] Inventors: Hiroshi Kazino, Komaki; Muneyuki Onogi, Kakamigahara, both of Japan

[73] Assignee: K.K. Aoyama Seisakusho, Nagoya, Japan

[21] Appl. No.: 802,298

[22] Filed: Dec. 4, 1991

[30] Foreign Application Priority Data

Jun. 7, 1989 [JP] Japan .................. 1-66329[U]

[51] Int. Cl.⁵ .................. F16B 37/06; F16B 35/00
[52] U.S. Cl. .................. 411/171; 411/339; 411/394; 411/414
[58] Field of Search .................. 411/171, 309–311, 411/338, 339, 411, 414, 394, 512

[56] References Cited

U.S. PATENT DOCUMENTS 1,260,154  3/1918  Day .................. 411/426 X
3,865,006  2/1975  Massoney .................. 411/394

FOREIGN PATENT DOCUMENTS 137777  1/1920  United Kingdom .................. 411/423

Primary Examiner—Neill R. Wilson
Attorney, Agent, or Firm—Cushman, Darby & Cushman

[57] ABSTRACT

Disclosed is a stud bolt having nonsymmetrical screw threads projecting from the shank thereof, wherein each screw thread of the stud bolt has an inwardly concave curved flank and an outwardly convex curved flank. With this arrangement, the load required to fit a resin clip over the stud bolt can be lowered below that needed for a conventional stud bolt while maintaining the load required to remove the clip equal to or more than that for the conventional bolt. Thus, this stud bolt allows a resin clip to be easily fitted over the bolt.

3 Claims, 1 Drawing Sheet

BOLT FOR USE WITH RESIN CLIPS

The present invention relates to a bolt such as a stud weld bolt suitable for fixing a part between its stud welding portion and a resin clip which is forcibly pressed onto the shank of the bolt.

BACKGROUND OF THE INVENTION

In a bolt for fixing a part between its stud welding portion and a resin clip, the resin clip is forcibly fitted forcibly over the shank. Ideally, the resin clip should require only a small effort to be fitted over the bolt shank, but should require a large load to be removed.

For this purpose, as shown in FIG. 2, a conventional stud bolt has been developed. The conventional stud bolt is provided with screw threads 10 having a triangular cross section. The screw threads 10 have unsymmetrical flanks with an inclination of 45° on one side and inclination of 15° on the other side. Although this conventional stud bolt can sufficiently bear the standard resin clip removing load of 35 Kgf, the load required to fit the resin clip over the shank exceeds 8 Kgf. Thus, this stud bolt has the disadvantage that considerable force is required to fit a resin clip over the shank.

SUMMARY OF THE INVENTION

An object of the present invention is to provide a bolt, requiring less effort to install a resin clip than the effort required for a conventional bolt, and a removing load equal to or larger than that of a conventional bolt.

The present invention is a bolt having nonsymmetrical screw threads projecting from the shank thereof, wherein the screw threads of the bolt have an inwardly concave curved flank and an outwardly convex curved flank. Further objects, features and advantages of the present invention will become apparent from the description of the preferred embodiment which follows, when considered together with the attached drawings.

DESCRIPTION OF THE PREFERRED EMBODIMENT

The present invention will be described below in more detail with reference to the illustrated embodiment of a stud weld bolt.

Figure 1:
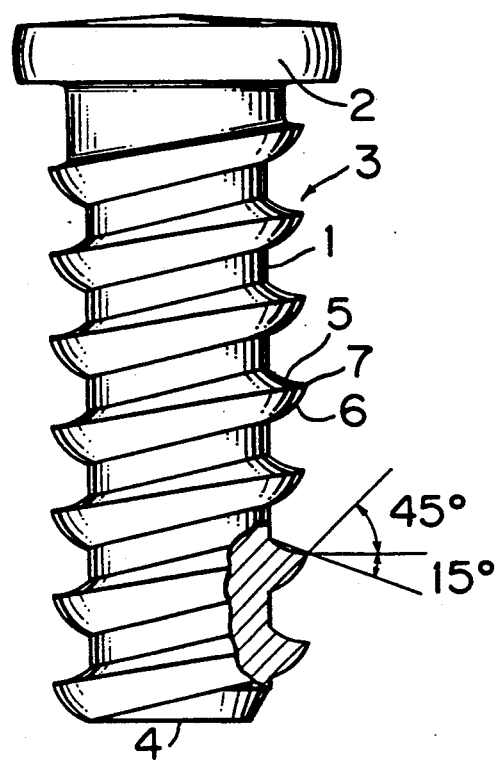
FIG. 1 is a side view, partially in cross section, showing an embodiment of the present invention.

FIG. 1 shows the bolt of the present invention having a shank 1, a stud welding portion 2, which is adapted to be fixed to a supporting member by welding, and nonsymmetrical screw threads 3, projecting outwardly from the shank.

As can be seen from FIG. 1, the nonsymmetrical screw threads 3 of the bolt have an inwardly concave curved flank 5 located on the thread surface which faces the stud welding portion 2 and an outwardly convex curved flank 6 located on the thread surface which faces away from the stud welding portion 2. Further, in the present embodiment, the angles between straight lines passing through the crest 7 of the screw thread 3 and intersection of the shank 1 and root of the thread flanks 5 and 6 and a plane perpendicular to the longitudinal axis of the bolt are 45° on the side of the threads 3 facing the shank end of the bolt 4 and 15° on the side of the threads 3 facing the stud welding end of the bolt. These angles are similar to these of a conventional bolt, however these angles as well as the size of the inwardly curved concave flank 5 and outwardly curved convex flank 6 may be suitably changed.

In an example of one embodiment of the present invention, the shank 1 has a diameter of 3.6 mm, the screw threads 3 have an outside diameter of 5.0 mm, the bolt has an entire length of 13.4 mm, and both the inwardly curved flank 5 and outwardly curved flank 6 have a radius of curvature of 1.5 mm. This example may be a bolt wherein the stud welding portion 2 of the bolt is welded and fixed to a supporting member. However an embodiment may be a usual stud bolt, weld bolt or the like, wherein one of the ends of the shank 1 is screwed into a threaded hole of a supporting member and thereby fixed to the member. A bolt as described above is welded to the supporting member, then a part to be fixed to the supporting member is placed over the shank i from the shank end 4 of the bolt. A resin clip is then fitted over the shank to fix the part between the stud welding portion 2 of the bolt and the resin clip in a manner similar to that for a conventional bolt.

Figure 2:
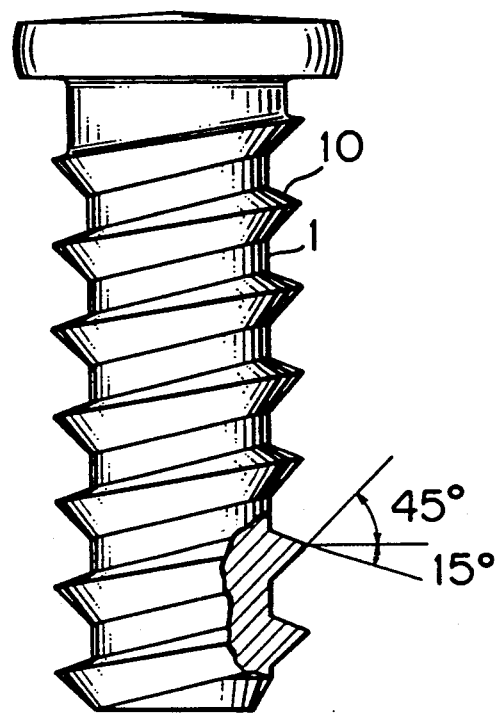
FIG. 2 is a side view, partially in cross section, showing a conventional stud bolt.

Each of the screw threads 3 of the bolt 1 according to the present invention, however, includes the outwardly convex curved flank 6 which is so formed that the angle defined between a plane tangent to the surface of curved flank 6 and the longitudinal axis of the bolt gradually decreases in the direction in which the resin clip is forcibly advanced. Thus the load needed to fit the resin clip over the bolt is smaller than that required for the conventional bolt shown in FIG. 2 and the resin clip can easily pass over the flank 6 when the resin clip is forcibly fitted over the bolt.

Further, when the resin clip is removed, the resin clip must pass over the screw threads from the side having the inwardly concave curved flank 5. The flank 5 is so formed that the angle defined between a plane tangent to the surface of curved flank 5 and the longitudinal axis of the bolt gradually increases in the direction in which the resin clip is removed. As a result, the load required to remove the resin clip from the bolt is equal to or larger than that required for the conventional bolt.

The above example according to the present invention was tested and compared to the standard bolt. The fitting and removing force of the resin clip on 5 stud bolts according to the present invention were measured with a push/pull gauge. The average fitting force was 5.0 Kgf, while the average value of the fitting force for 5 conventional stud bolts shown in FIG. 2 was 8.8 Kgf. Thus the superiority of the bolt of the present invention over the conventional bolt was confirmed. In addition, both the removing force of the stud bolt of the present invention and that of the conventional bolt were more than 50 Kgf, and thus the bolt according to the present invention exhibited sufficient resin clip removal performance.

According to the present invention as described above, since each screw thread formed on the shank has an inwardly concave curved flank and an outwardly convex curved flank, the fitting load of a resin clip can be lowered below that required by the conventional bolt while maintaining a removing load equal to or more than that of the conventional bolt. Thus, the bolt according to the present invention causes fitting of a resin clip of the shank of the bolt to be easily carried out. Consequently, the present invention can solve the problem of the conventional bolt, and thus is very valuable when practically used.

While the present invention has been illustrated by means of a preferred embodiment, one of ordinary skill in the art will recognize that modifications and improvements can be made while remaining within the scope and spirit of the present invention as defined by the appended claims.

What is claimed is:

1. A stud bolt, comprising:
   a stud welding portion;
   a shank portion, attached to the stud welding portion; and
   screw threads formed on the shank,
   wherein the screw threads have a convex, curved surface facing away from the stud welding portion, and a concave, curved surface facing toward the stud welding portion, such that the convex and concave surfaces converge and meet to form a single common thread crest.

2. A bolt according to claim 1, wherein an angle between a plane perpendicular to a central axis of the shank and a line passing through the single common thread crest and a point of intersection of a root of the screw threads and each curved surface, is 15° on a side of the threads facing the stud welding portion and 45° on a side of the threads facing away from the stud welding portion.

3. A bolt according to claim 1, wherein the convex and concave surfaces of the threads are nonsymmetrical with respect to a plane perpendicular to an axis of the shank of the bolt which passes through the single common thread crest.

* * * * *